(12) United States Patent
Festner et al.

(10) Patent No.: US 9,227,367 B2
(45) Date of Patent: Jan. 5, 2016

(54) METHOD AND APPARATUS FOR USE IN MANUFACTURING A FILTER ELEMENT

(75) Inventors: Maria Festner, Wiesbaden (DE); Simon Floren, Waldbrunn (DE); Timm Wulff, Taunusstein (DE)

(73) Assignee: BRITA GMBH, Taunusstein (DE)

( * ) Notice: Subject to any disclaimer, the term of this patent is extended or adjusted under 35 U.S.C. 154(b) by 0 days.

(21) Appl. No.: 14/125,398

(22) PCT Filed: Jun. 23, 2012

(86) PCT No.: PCT/EP2012/062059
§ 371 (c)(1),
(2), (4) Date: Dec. 11, 2013

(87) PCT Pub. No.: WO2012/175656
PCT Pub. Date: Dec. 27, 2012

(65) Prior Publication Data
US 2014/0131923 A1    May 15, 2014

(30) Foreign Application Priority Data

Jun. 24, 2011  (EP) ..................................... 11171332

(51) Int. Cl.
*B29C 67/20* (2006.01)
*B01D 39/16* (2006.01)
*B01D 39/20* (2006.01)

(52) U.S. Cl.
CPC ............ *B29C 67/20* (2013.01); *B01D 39/1607* (2013.01); *B01D 39/1638* (2013.01); *B01D 39/2055* (2013.01)

(58) Field of Classification Search
CPC ........... B01D 39/1607; B01D 39/1638; B01D 39/2055; B29C 67/20
USPC ............................. 264/413; 425/508; 162/141
See application file for complete search history.

(56) References Cited

U.S. PATENT DOCUMENTS

| 5,606,746 | A |   | 3/1997 | Shelton et al. |
| 5,928,588 | A | * | 7/1999 | Chen et al. ..................... 264/113 |
| 6,093,474 | A | * | 7/2000 | Sironi ............................ 428/156 |
| 6,309,546 | B1 | * | 10/2001 | Herrmann et al. ........ 210/500.25 |
| 2003/0203694 | A1 | * | 10/2003 | Deka et al. .................... 442/359 |

FOREIGN PATENT DOCUMENTS

| EP | 1 484 099 A2 | 12/2004 |
| WO | 95 03019 A1 | 2/1995 |
| WO | 98 10855 A1 | 3/1998 |
| WO | 00 10687 A1 | 3/2000 |

* cited by examiner

*Primary Examiner* — Jacob Thomas Minskey
(74) *Attorney, Agent, or Firm* — Hudak, Shunk & Farine Co. LPA

(57) ABSTRACT

A method of manufacturing a porous fluid treatment element, e.g. a filter element, includes forming a layered structure having at least two layers and subjecting the layered structure to at least a heat treatment. The step of forming a layered structure includes forming a first layer including particulate matter including at least a binder and applying a second layer including particulate matter including at least a binder directly onto the first layer on a first side thereof. The step of forming a layered structure further includes applying at least one of radiation and heat to at least the first side of the first layer prior to applying the second layer.

27 Claims, 1 Drawing Sheet

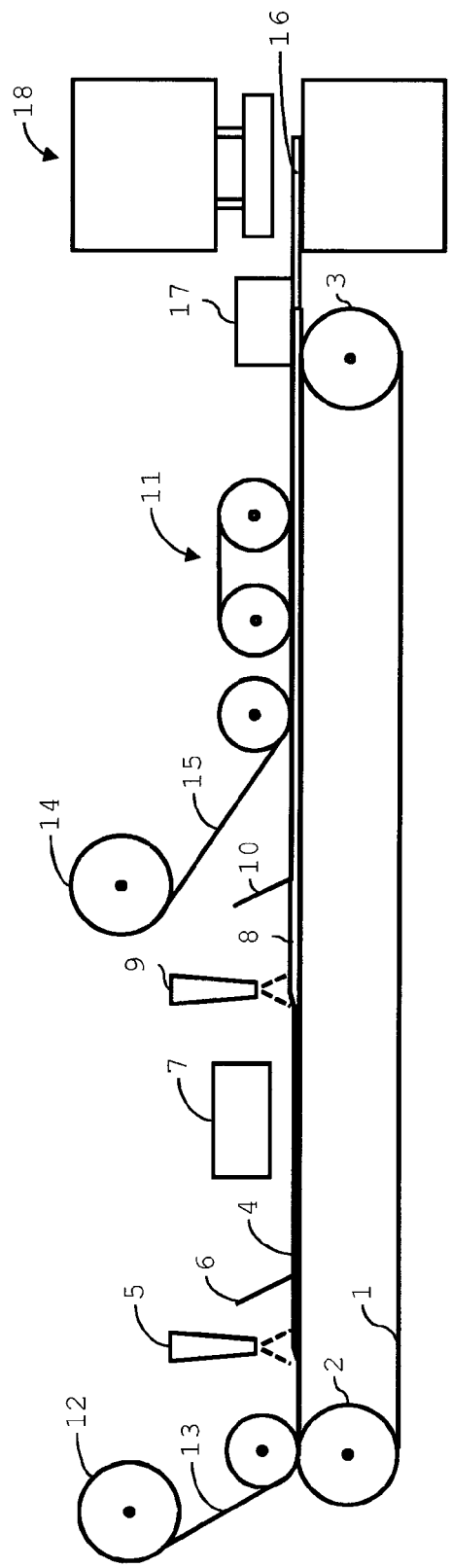

METHOD AND APPARATUS FOR USE IN MANUFACTURING A FILTER ELEMENT

FIELD OF THE INVENTION

The invention relates to a method of manufacturing a porous fluid treatment element, e.g. a filter element, including: forming a layered structure having at least two layers, the step of forming a layered structure including: forming a first layer comprising particulate matter comprising at least a binder; and applying a second layer comprising particulate matter comprising at least a binder directly onto the first layer on a first side thereof; and subjecting the layered structure to at least a heat treatment.

The invention also relates to an apparatus for forming a layered structure for fabricating a porous fluid treatment element such as a filter element, the layered structure having at least two layers, which apparatus includes: an apparatus for providing a support surface; and at least one application device for applying at least one layer comprising particulate matter comprising at least a binder in overlap with at least a region of the support surface, wherein the application device(s) and the support surface are movable relative to one another in at least a direction parallel to the support surface, wherein the apparatus comprises at least one device for applying at least one of heat and radiation to at least a first side of a first layer applied in overlap with at least a region of the support surface, and wherein this device, the support surface and at least one of the at least one application devices are arranged to be movable to allow a second layer comprising particulate matter comprising at least a binder to be applied subsequent to the application of at least one of heat and radiation.

BACKGROUND OF THE INVENTION

WO 98/10855 A1 discloses porous structures and processes for the manufacture thereof. In one embodiment, an apparatus comprises a movable belt, providing a flat surface, the belt being driven by a motor. Above the surface is a first hopper which dispenses a first type of media, which is uniformly laid out by a doctor blade or roller. A second hopper is provided downstream from the first, to dispense an intermediate layer of media, which is again uniformly laid out by a roller. Further downstream is a third hopper, which dispenses a third type of media, which is also uniformly laid out by a roller. As a result, a product is formed which can be densified on the belt by means not shown to form the green product, or subsequently densified. It is disclosed that one could also form multi-layered products with two or more zones or layers of different character by sequentially compressing an added layer over a previously made flat structure. To do so would merely require the step of feeding a subsequent layer of another media composite, prior to heating, followed by densification of all the layers.

WO 95/03019 A1 discloses a manufacturing apparatus comprising a production line fed by three reels of a web-like containing and supporting material. An amount of absorbent material is deposited onto the web material from the reels at a depositing station. The deposition is achieved by means of a dispenser comprising two containers arranged in sequence from which the materials are poured. The absorbent material is blended in advance with a bonding agent, in particle, fibre or powder form, which can be activated by application of heat. Immediately downstream of the deposition station, rollers are provided for locally removing super-absorbent polymers (SAP) or other absorbent material. Then the web passes through a sticking station provided with means for applying heat such as, for example, an infrared oven, or heaters capable of blowing hot air, or other known devices. At a subsequent gluing station, a dispenser applies longitudinal lines or stripes of an adhesive material onto the web. Downstream of the dispenser, two calibrating or pressure rollers join together the web-like sheet from a further reel and the sheet, thus covering and enclosing between them the absorbent materials without any appreciable compression thereof. The joining of the two sheets occurs along the adhesive stripes. Downstream of the rollers, the apparatus provides for an arrangement that is substantially similar to the one already illustrated, with a deposition station, rollers for locally removing the SAP material, a sticking station and a gluing station that are substantially similar to the previous ones.

A problem of dispensing multiple layers of media directly onto one another before forming a green product is that the media mix at the interfaces, so that the layers are not very well defined and have deviating properties, in particular pore sizes and porosities, in the region of the interface between two layers. This problem also occurs when layers of different character are sequentially compressed over a flat structure made previously, because the compression results in extra mixing of the media.

SUMMARY OF THE INVENTION

It is an object of the invention to provide a method and apparatus of the types mentioned above in the opening paragraphs that make it possible to manufacture layered filter elements with relatively well-defined boundaries between porous layers that are not separated by webs.

This object is achieved with the method according to the invention, which is characterised in that the step of forming a layered structure further includes applying at least one of radiation and heat to at least the first side of the first layer prior to applying the second layer.

By applying at least one of radiation and heat to at least the first side of the first layer prior to applying the second layer, the particles comprising binder are joined on at least the first side of the first layer. This side is thus solidified to a certain extent. At the very least, mixing between these particles and those of the second layer, which is applied directly onto the first side of the first layer, i.e. with no intermediate layers of the filter element, is made difficult to impossible. Compared to mechanical solidification, the application of heat or radiation requires little or no contact pressure. This results in less mixing between the first layer and any layer present underneath it, and allows the first layer to have a higher porosity and average pore size. Thus, the finished fluid treatment element can have a lower flow resistance. This is particularly the case where the step of applying at least one of radiation and heat to at least the first side of the layer is carried out with the first side of the first layer exposed to a pressure at or below ambient pressure, in particular when it is continuously exposed to pressure levels at or below ambient pressure from its formation up to the application of the second layer. It is observed that the step of applying at least one of heat and radiation to at least the first side of the first layer can comprise applying at least one of heat and radiation from a direction to only the first side of the first layer, so that solidification of the opposite side of the first layer takes place predominantly during the step of subjecting the layered structure to at least a heat treatment. This ensures that the first layer is only solidified to an extent necessary to provide a sharp interface between the first layer and the second layer.

The layered structure and thus the fluid treatment element can consist of no more than two layers formed from particulate matter in the manner defined above, with or without additional layers formed in a different manner. Particulate matter is understood to mean tiny subdivisions of solid material suspended in a gas, which may be air, or in a liquid.

In an embodiment of the method, the layered structure is essentially planar.

This allows the layers to be built up by being deposited as horizontal layers over a support surface. The particles in the layers need not adhere strongly to each other until after the layered structure has been subjected to at least a heat treatment to solidify the layered structure.

In an embodiment, at least one of the steps of forming a first layer and applying a second layer includes forming a layer of particulate matter in the form of a granular medium.

Granular media are conglomerations of discrete solid, macroscopic particles characterised by a loss of energy whenever the particles interact. The particles are therefore suspended in air rather than in a liquid. Consequently, the method is simpler to implement and more energy-efficient, since no liquid need be evaporated or drained. Moreover, it is easier to raise the temperature of the first layer in a short time, so that the step of applying at least one of radiation and heat to at least a first side of the first layer prior to applying the second layer can be shorter.

In a variant of this method, at least one of the steps of forming the first layer and applying the second layer includes doctoring the granular medium.

This results in more uniform layers. Compared to using rollers, there is less compacting, resulting in filter elements with a lower flow resistance.

In an embodiment, the first layer is applied over a region of a support surface and the first layer remains on the support surface until after the layered structure has been subjected to at least the heat treatment.

An effect is that it is not necessary to solidify the first layer prior to application of the second layer, as it need not be self-supporting.

In a variant, the support surface is a moving support surface.

This variant can be implemented as a continuous process.

In an embodiment, the step of subjecting the layered structure to at least a heat treatment includes passing the layered structure through a double-belt press.

Heat transfer is through conduction through the surfaces of the belts of the double-belt press. The double-belt press applies a pressure sufficient to ensure better contact, thus shortening the time required to solidify the layered structure into a self-supporting structure. To this end, a pressure of no more than 5 kPa, in particular less than 2 kPa, more particularly less than 1.8 kPa, is applied by the double-belt press.

An embodiment of the method includes providing a web of semi-permeable material on at least one side of the layered structure.

An effect is to strengthen the fluid treatment element. The web can also retain particles, in particular particles making up the layered structure that have not been fully bound and would otherwise be flushed out on first use. The web can also act as a mechanical pre-filter, being generally permeable to fluid but retaining solid particles of at least a certain minimum dimension. In one embodiment, the web of material is a nonwoven web of material. In another embodiment, the web of material is a mesh.

In an embodiment, the first and second layer differ in respect of at least one of their thickness, composition of the particulate matter, particle size distribution of the particulate matter and average particle size of the particulate matter.

An effect is to improve the properties of the porous fluid treatment element. As an example, where the compositions of the particulate matter differ, different substances can be removed from the filter element. For example, an ion exchange material can remove hardness. Active carbon can ensure that the ion exchange material cannot affect the taste of the filtrate if it passes first through a layer with ion exchange material and then through a layer with active carbon.

In a variant, a layered structure with layers having successively decreasing average pore size is formed.

Fluid flowing through such fluid treatment elements first encounters the layer with the largest average pore size. This decreases the likelihood that the filter will become blocked.

In a variant, a layered structure of which the layers have thicknesses decreasing with decreasing average pore size is formed.

This helps keep the flow resistance relatively low without decreasing the effectiveness of the fluid treatment element.

In an embodiment, the particulate matter of at least one of the first and second layers includes at least one of an adsorbent, an absorbent, an ion exchange material, a catalyst, a desorbent, a chelating material and a biologically active substance, e.g. a biocide.

Compared to mechanical filtration, further substances can be removed from the medium to be filtered with this embodiment. Moreover, the layered structure allows for different substances to be filtered out in different layers.

In an embodiment of the method, the step of applying at least one of radiation and heat comprises at least one of irradiating at least the first side of the first layer and transferring heat through convective heat transfer, in particular only irradiating at least the first side of the first layer.

Thus, this step of solidifying at least a region of the first layer adjacent the first side of the first layer is carried out in a contactless manner, so that the average pore size can be kept relatively large. In embodiments in which the particulate matter is deposited in the form of a layer of granular material or even powder, irradiating at least the first side of the first layer rather than transferring heat through convection has the effect that the layer of material is left relatively undisturbed.

In an embodiment, the binder includes a meltable material.

The binder particles melt or soften under the influence of the applied heat, thus enveloping each other and any particles of non-binder material. On cooling down a relatively strong bond is formed. Compared to, for example, binders cured by ultraviolet radiation or thermosetting binders, a stronger surface onto which the second layer can be applied is formed. Moreover, the step of subjecting the layered structure to at least a heat treatment results in stronger filter elements.

An embodiment includes separating the fluid treatment elements from the layered structure.

Separating can take place by cutting, punching, sawing, laser cutting and the like. An effect is that it is possible to form a layered structure with relatively large dimensions from which smaller fluid treatment elements can be formed. The rate at which filter elements are produced can be relatively high and there is no need to use a multiplicity of moulds.

According to another aspect, the apparatus according to the invention is characterised in that the apparatus is configured to apply the second layer directly onto the first side of the first layer subsequent to the application of at least one of heat and radiation.

The apparatus is configured to carry out at least the first stage of a method according to the invention in that the at least one device for applying at least one of heat and radiation to at least the first side of the first layer provides a relatively solid surface onto which the second layer can be applied without mixing with the particulate matter of the first layer. Because the application device(s) and the support surface are movable relative to one another, in at least a direction parallel to the support surface, the first layer can remain in a position in which it is supported at least partially by the support surface, so that it is sufficient to apply a (relatively short) treatment to solidify at least the first side of the first layer. In an embodiment, there are provided a first application device for applying the first layer comprising particulate material and a second application device for applying the second layer comprising particulate material, thus further adapting the apparatus to carry out at least the first stage of the method according to the invention.

In an embodiment, the apparatus for providing a support surface is arranged to provide an essentially planar, in particular essentially horizontal, support surface.

This allows the layers to be deposited in granular or powder form. They can be rolled or doctored into a uniform layer that is only completely solidified after the layered structure has been formed, e.g. by subjecting the entire layered structure to at least a heat treatment.

In an embodiment, the apparatus for providing a support surface is arranged to provide a movable support surface.

This embodiment results in a relatively high throughput rate.

In a variant, the apparatus for providing a support surface includes at least one device for moving a web, in particular an endless belt, providing the support surface.

This has the effect that the method can be implemented as a continuous process. Discrete moulds are not required. In a variant, respective ones of the application devices for applying at least one layer comprising particulate matter are provided on either side of the device for applying at least one of heat and radiation along the path of the moving web providing the support surface.

In an embodiment, the at least one device for applying at least one of heat and radiation comprises at least one of at least one device for irradiating at least the first side of the first layer and at least one device for transferring heat through convective heat transfer.

Thus, the first side of the first layer can be solidified without disturbing the first layer. Contact is not required.

An embodiment includes at least one device for subjecting the layered structure to at least a heat treatment.

This embodiment is suitable for providing self-supporting layered structures from which the fluid treatment elements can be fabricated or which themselves constitute the fluid treatment elements.

In an embodiment, the device for subjecting the layered structure to at least a heat treatment comprises a double-belt press.

This device allows one to subject the layered structure to a heat treatment that is efficient, because only the layered structure and certain parts of the double-belt press itself are heated. The slight pressure exerted by the double-belt press provides better contact and thus better heat transfer.

An embodiment of the apparatus further includes at least one device for separating fluid treatment elements from the layered structure.

The separation will generally be carried out after the layered structure has been subjected to at least a heat treatment so as to provide a self-supporting layered structure. Separating can take place by cutting, punching, sawing, laser cutting and the like. An effect is that it is possible to form a layered structure with relatively large dimensions from which smaller filter elements can be formed. The rate at which fluid treatment elements are produced can be relatively high and there is no need to use a multiplicity of moulds.

BRIEF DESCRIPTION OF THE DRAWING

The invention will be explained in further detail with reference to the accompanying drawing, in which an embodiment of an apparatus for fabricating filter elements is shown very schematically.

DETAILED DESCRIPTION OF THE INVENTION

The illustrated apparatus is configured for manufacturing planar multilayered filter elements that are self-supporting structures. They can be inserted into a holder of a filter system in order to treat fluids, in particular liquids such as water. In a simple embodiment, the filter elements are suitable for carrying out mechanical filtration only, but in general the filter elements comprise active substances that selectively bind elements present in the fluid. They may also comprise substances that are desorbed or otherwise leach into liquid passing through the filter elements.

Typically, the filter elements have a thickness larger than 1 mm, more particularly larger than 5 mm. In general, the thickness will be smaller than 20 mm, in particular smaller than 15 mm. The porosity of at least one layer has a value larger than 20%, in particular larger than 30%, more particularly larger than 40%. It can have a value smaller than 80%, in particular smaller than 70%, more particularly smaller than 60%. Typically, the average pore size will be larger than 2 µm, in particular larger than 5 µm. The average pore size of at least one of the layers will be smaller than 100 µm, particularly smaller than 70 µm, more particularly smaller than 50 µm.

The illustrated apparatus comprises an apparatus for providing a support surface in the form of a main endless belt 1 on support drums 2, 3 of which at least one is powered by an electric motor (not shown).

A device is provided for depositing a first layer 4 comprising particulate matter comprising at least a binder over a region of the main endless belt 1. In the illustrated embodiment, the particulate matter comprises particulate matter deposited in dry form. By way of example, a first hopper 5 and first doctor blade 6 are provided for depositing the particulate matter in a layer of uniform thickness and density.

In an alternative embodiment, the first layer 4 can be sprayed on, e.g. in the form of a suspension of particulate matter in a liquid. It is also possible in principle to use a roller instead of the first doctor blade 6. Further alternative devices for depositing the first layer 4 include shakers that dispense the particulate matter through perforations, devices, in particular moving devices that tip the particulate matter out of a container, etc.

The particulate matter comprises at least particles of a binder material. The binder material is a material that binds other particles when subjected to heat or radiation of another form. In principle, the binder can be a UV-curable material or a thermosetting plastic. In the embodiments to be described herein, the binder is made of a meltable material, in particular a thermoplastic material. Suitable materials include polyolefins, polyvinyls, polyvinyl esters, polyethylenes, polyamides, polyurethanes and the like, as well as mixtures thereof. The melting point of the binder is at least 50° C., preferably higher than 100° C. It remains thermally stable to at least 150° C. The particle size of the binder material can be of the order of 10 to 1000 µm, for example.

In case the first layer 4 is to be used only for mechanical filtration the first layer can exist exclusively of binder material, optionally augmented by particles made of chemically inert materials. In general, however, the first layer 4 will further include particles of one or more active substances that selectively interact with, in particular bind to, elements in a fluid to be filtered by the filter element. Examples include particles (including chopped fibres) of activated carbon, ion exchange materials, chelating agents and the like. Due to the fact that these particles are combined with the binder particles to form a monolithic layer that is subjected to relatively little compression, these particles can be relatively small without increasing the flow resistance. Relatively small particles present a relatively high surface area. Moreover, a smaller quantity of this material is required to achieve a given effectiveness of the filter system comprising the filter element.

The particles made of an active substance will generally be smaller than the particles made of binder material on average, although some of the particles made of an active substance will be larger, particularly in the case of chopped active carbon fibres. Where they are larger on average, the binder particles play a role in increasing the pore size of the filter element without having to use relatively large particles of active material.

The filter elements made using the illustrated apparatus are multi-layered. To form a further layer, the first layer 4 is carried by the main endless belt 1 to a device 7 for applying heat to an upper side of the first layer 4. The device 7 applies heat without contacting the first layer 4. It can be a device for irradiating the top of the first layer 4 with electromagnetic radiation in the infra-red or microwave region of the electromagnetic spectrum. In the latter case, the first layer 4 can optionally include, at least on application over a region of the main endless belt 1, a polar compound with a higher electric dipole moment than the binder and/or the active substance or substances. Optionally or alternatively, the device 7 can comprise a device for convective heat transfer, e.g. a device arranged to blow hot air across the first layer 4.

At least the top surface of the first layer 4 is heated to a temperature sufficient for the binder material at least to become tacky. In general, the temperature will be raised to at least a softening point of the binder as determined by any one of ISO 306, ASTM-D 648 or ASTM E28-67. In an embodiment, the temperature in this surface region is raised to a value at or above the melting temperature of the binder material (the mid-point of the melting range for a thermoplastic polymer binder).

In an alternative embodiment, heat may additionally be applied from below.

The treatment by the device 7 causes the binder to immobilise the particles at the surface of the first layer 4.

Following the application of at least one of heat and radiation, the first layer 4, which remains on the support surface provided by the main endless belt 1 is moved on to a further station. This station comprises at least one device for applying directly onto the first layer 4 a second layer 8 comprising particulate matter comprising at least a binder. Because the treatment by the device 7 causes the binder to immobilise the particles at the surface of the first layer 4, the particles applied at this stage do not mix with those of the first layer 4 or sink into the first layer 4. As with the devices for forming the first layer 4, those for applying the second layer 8 include a second hopper 9 and a second doctor blade 10. In alternative embodiments, the second layer 8 can be sprayed on. A roller can in principle be used as an alternative to the doctor blade 10.

In the example of the drawing, only two layers are applied in this way. It will be understood that the process can be repeated to apply a third layer directly on top of the second layer 8, in which case a further device 7 for applying at least one of radiation and heat to at least a top side of the second layer 8 would precede a device for applying a third layer comprising particulate matter comprising at least a binder.

In the illustrated embodiment, however, the double-layered structure is subjected to at least a heat treatment in a double-belt press 11. It is noted that the double-belt press 11 is configured to exert only a light pressure on the double-layered structure, sufficient to increase the transfer of heat, but not so high as substantially to reduce the average pore size in the first and second layers 4, 8.

An optional feature is also illustrated in the drawing, namely the application of webs of semi-permeable material on either side of the layered structure. The semi-permeable material can be a non-woven fabric or, as in the case of the present example, a mesh, e.g. a woven or extruded mesh. To apply the web of semi-permeable material, a first reel 12 of mesh material is provided to lay down a first mesh 13 on the main endless belt 1. A second reel 14 is provided to apply a second mesh 15 to the top surface of the second layer 8 prior to its entering the double belt press 11. In an alternative embodiment, one or both of the meshes 13, 15 are applied after the layered structure has passed through the double-belt press 11. In yet another alternative embodiment, a web of semi-permeable material is applied to only one side of the layered structure.

It would be possible in principle to provide the main endless belt 1 with a multiplicity of moulds for forming individual filter elements. In the illustrated embodiment, however, the main endless belt 1 is essentially flat and used to form sheets 16 from which the filter elements are separated. A cutting device 17 is arranged to cut these sheets 16 from the layered structure as it reaches the turning point of the main endless belt 1. The cut sheet 16 is transferred to a die and punch device 18 that punches the filter elements from the sheet 16. The remainder of the sheet 16 can be ground and processed to be reused for forming the first and second layers 4, 8.

The first and second layers 4, 8 in one embodiment have different average pore sizes, which can be achieved, for example, by using differently sized binder particles to form the respective layers. The layer with the larger average pore size also has a larger thickness. In use, the fluid to be filtered passes through the layer with the larger average pore size first. In this way, blocking of the filter element is less likely to occur. If there are more than two layers stacked directly on top of each other, then the average pore size will decrease progressively from one layer to the next, as will the average pore size. Typically, the average pore size will be larger than 2 μm, in particular larger than 5 μm. The average pore size of at least one of the layers will be smaller than 100 μm, particularly smaller than 70 μm, more particularly smaller than 50 μm.

The methods discussed herein are suitable for providing filter elements with relatively well-defined separate layers made of binder material and optionally material for selectively interacting with substances in the medium to be filtered. This is achieved without having to provide intermediate layers, such as webs of woven or non-woven fabric.

Compared to filter systems comprising agglomerate particles, the filter elements comprised of monolithic layers produced using the methods outlined herein are not subject to channelling. Smaller particles of active material can be used without the risk of dense packing of such particles taking place. Thus, filter systems using filter elements made using the methods and apparatus outlined herein can be relatively effective and have a relatively low flow resistance.

The invention is not limited to the embodiments described above but can be varied within the scope of the accompanying claims. For example, the layered structure comprising the first and second layers 4, 8 can be combined or formed on further layers produced in a different manner, e.g. sintered, that further strengthen the filter elements.

What is claimed is:

1. A method of manufacturing a porous fluid treatment element, comprising the steps of:
   forming a layered structure having at least two layers, the step of forming a layered structure including:
   forming a first layer comprising particulate matter comprising at least a binder that binds other particles when subjected to heat or radiation of another form than heat; and
   applying a second layer comprising particulate matter comprising at least a binder directly onto the first layer on a first side thereof, the binder binding the other particles when subjected to the heat or the radiation of another form than heat; and
   subjecting the layered structure to at least a heat treatment, wherein
   the step of forming the layered structure further includes applying at least one of radiation and heat to at least the first side of the first layer prior to applying the second layer.

2. The method according to claim 1, wherein the layered structure is essentially planar.

3. The method according to claim 1, wherein at least one of the steps of forming a first layer and applying a second layer include forming a layer of particulate matter in the form of a granular medium.

4. The method according to claim 3, wherein at least one of the steps of forming the first layer and applying the second layer includes doctoring the granular medium.

5. The method according to claim 1, wherein the first layer is applied over a region of a support surface and the first layer remains on the support surface until after the layered structure has been subjected to at least the heat treatment.

6. The method according to claim 5, wherein the support surface is a moving support surface.

7. The method according to claim 1, wherein the step of subjecting the layered structure to at least a heat treatment includes passing the layered structure through a double-belt press.

8. The method according to claim 1, including providing a web of semi-permeable material on at least one side of the layered structure.

9. The method according to claim 1, wherein the first and second layer differ in respect of at least one of their thickness, composition of the particulate matter, particle size distribution of the particulate matter and average particle size of the particulate matter.

10. The method according to claim 9, wherein a layered structure with layers having successively decreasing average pore size is formed.

11. The method according to claim 10, wherein a layered structure of which the layers have thicknesses decreasing with decreasing average pore size is formed.

12. The method according to claim 1, wherein the particulate matter of at least one of the first and second layers includes at least one of an adsorbent, an absorbent, an ion exchange material, a catalyst, a desorbent, a chelating material and a biologically active substance.

13. The method according to claim 1, wherein the binder includes a meltable material.

14. The method according to claim 1, including separating the fluid treatment elements from the layered structure.

15. The method according to claim 1, wherein the step of applying at least one of radiation and heat comprises at least one of irradiating at least the first side of the first layer and transferring heat through convective heat transfer.

16. An apparatus for forming a layered structure for fabricating a porous fluid treatment element, the layered structure having at least two layers, which apparatus comprises:
    an apparatus for providing a support surface; and
    at least one application device for applying at least one layer comprising particulate matter comprising at least a binder in overlap with at least a region of the support surface, wherein the application device(s) and the support surface are movable relative to one another in at least a direction parallel to the support surface,
    wherein the apparatus comprises at least one device for applying at least one of heat and radiation to at least a first side of a first layer applied in overlap with at least a region of the support surface, and
    wherein the device for applying at least one of heat and radiation, the support surface and at least one of the at least one application devices are arranged to be movable to allow a second layer comprising particulate matter comprising at least a binder to be applied subsequent to the application of at least one of heat and radiation, and
    wherein the apparatus is configured to apply the second layer directly onto the first side of the first layer subsequent to the application of at the least one of heat and radiation to at least the first side.

17. The apparatus according to claim 16, configured to carry out a method of manufacturing a porous fluid treatment element, comprising the steps of: forming a layered structure having at least two layers, the step of forming a layered structure including: forming a first layer comprising particulate matter comprising at least a binder; and applying a second layer comprising particulate matter comprising at least a binder directly onto the first layer on a first side thereof; and subjecting the layered structure to at least a heat treatment, wherein the step of forming the layered structure further includes applying at least one of radiation and heat to at least the first side of the first layer prior to applying the second layer.

18. The apparatus according to claim 16, arranged to provide an essentially planar, in particular essentially horizontal, support surface.

19. The apparatus according to claim 18, wherein the support surface is arranged essentially horizontal.

20. The apparatus according to claim 16, arranged to provide a movable support surface.

21. The apparatus according to claim 16, wherein the apparatus for providing the support surface includes at least one device for moving a web providing the support surface.

22. The apparatus according to claim 21, wherein the apparatus for providing the support surface includes an endless belt that provides the support surface.

23. The apparatus according to claim 16, wherein the at least one device for applying at least one of heat and radiation comprises at least one of at least one device for irradiating at least the first side of the first layer and at least one device for transferring heat through convective heat transfer.

24. The apparatus according to claim 16, including at least one device for subjecting the layered structure to at least a heat treatment.

25. The apparatus according to claim 24, wherein the device for subjecting the layered structure to at least a heat treatment comprises a double-belt press.

26. The apparatus according to claim 16, further including at least one device for separating fluid treatment elements from the layered structure.

27. The apparatus according to claim 16, wherein the porous fluid treatment element is a filter element.

* * * * *